United States Patent [19]

Stewart

[11] Patent Number: 5,311,605

[45] Date of Patent: May 10, 1994

[54] OPTICAL DEVICES INCORPORATING SLOW WAVE STRUCTURES

[75] Inventor: William J. Stewart, Blakesley, England

[73] Assignee: Gec-Marconi Limited, England

[21] Appl. No.: 989,778

[22] Filed: Dec. 14, 1992

[30] Foreign Application Priority Data

Dec. 16, 1991 [GB] United Kingdom ............... 9126652

[51] Int. Cl.$^5$ ............................................... G02B 6/26
[52] U.S. Cl. ........................................ 385/27; 385/10; 385/129
[58] Field of Search ........................ 385/1-3, 385/10, 27, 28, 37, 129-132

[56] References Cited

U.S. PATENT DOCUMENTS

| 3,719,906 | 3/1973 | Tournois | 385/37 X |
| 3,795,434 | 3/1974 | Ash | 385/37 X |
| 4,208,091 | 6/1980 | Cheo et al. | 385/3 |
| 4,544,230 | 10/1985 | Caulfield | 385/10 X |
| 4,923,266 | 5/1990 | Bovet et al. | 350/96.15 |
| 5,093,876 | 3/1992 | Henry et al. | 385/28 |
| 5,150,436 | 9/1992 | Jaeger et al. | 385/2 |
| 5,172,258 | 12/1992 | Verber | 385/132 X |

FOREIGN PATENT DOCUMENTS

| 0226728 | 7/1987 | European Pat. Off. . |
| 0344027 | 11/1989 | European Pat. Off. . |
| 2119163 | 11/1983 | United Kingdom . |
| 2161612 | 1/1986 | United Kingdom . |
| 2209408 | 5/1989 | United Kingdom . |

OTHER PUBLICATIONS

Journal of Lightwave Technology, vol. 8, No. 8, Aug. 1990, New York, pp. 1167-1176, Anemogiannis et al., "Integrated Optical Architectures for Taped Delay lines", p. 1169; FIG. 3.

Primary Examiner—John D. Lee
Attorney, Agent, or Firm—Kirschstein, Ottinger, Israel & Schiffmiller

[57] ABSTRACT

An optical device comprising a length of optical waveguide (1) having incorporated therein an extended sequence of coupled single resonator structures (9) so as to form an optical slow wave structure. The sequence of resonator structures is suitably formed by a Bragg diffraction grating pattern (7) extending along the waveguide.

7 Claims, 2 Drawing Sheets

OPTICAL DEVICES INCORPORATING SLOW WAVE STRUCTURES

BACKGROUND OF THE INVENTION

1. Field of the Invention

This invention relates to optical devices.

2. Description of the Related Art

In opto-electronic signal transmission devices the delay of a radio frequency (r.f.) modulated optical signal is often required and is generally effected by the use of an appropriate length of optical waveguide, e.g., optical fibre. Such a delay device exhibits low loss, low dispersion and good thermal stability, but since the velocity of light in a typical optical waveguide is high, e.g. two thirds of the velocity of light in free space, long lengths of waveguide are typically required. This makes such a delay device difficult to incorporate in an integrated optical device, i.e. an optical device formed on the surface of a semiconductor chip.

SUMMARY OF THE INVENTION

It is an object of the present invention to provide an optical device whereby this difficulty may be overcome.

According to the present invention there is provided an optical device comprising a length of optical waveguide having incorporated therein an extended sequence of coupled single resonator structures so as to form an optical slow wave structure.

The sequence of coupled resonator structures is suitably formed by a Bragg diffraction grating pattern extending along the waveguide in the direction of propagation of light through the waveguide, the grating pattern exhibiting spaced phase steps so that a resonator structure is formed around each phase step.

The grating pattern suitably comprises a corrugated surface or a pattern of material of cyclically varying refractive index.

In a device according to the invention there is suitably provided an impedance matching device at each end of the sequence of coupled resonator structures. The impedance matching devices suitably each comprise a grating pattern extending along the waveguide.

BRIEF DESCRIPTION OF THE DRAWINGS

One device in accordance with the invention will now be described, by way of example, with reference to the accompanying drawings in which.

DETAILED DESCRIPTION OF THE PREFERRED EMBODIMENT

Figure 1:
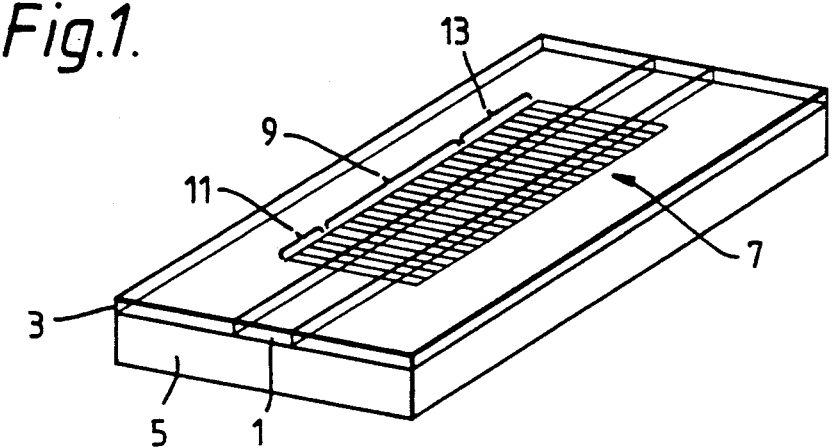
FIG. 1 is a diagram illustrating the general form of the device.

The device, which is intended for use as a delay line, is fabricated in the form of an integrated optical device. Referring to FIG. 1, the device includes an optical waveguide comprising a narrow stripe 1 of material in a dielectric layer 3 carried on one main face of a substrate 5, the material of the stripe 1 having a higher refractive index than the material of the layer 3 which in turn has a higher refractive index than the material of the substrate 5. On the exposed surface of the layer 3, over the stripe 1, there is formed a Bragg diffraction grating structure 7, the lines of the grating 7 extending orthogonally to the length of the stripe 1. The grating 7 comprises three sections, a central section 9 which, with the corresponding part of the optical waveguide, constitutes an extended sequence of coupled single resonators at the operating frequencies of the device, and end sections 11 and 13 each of which, with the corresponding part of the optical waveguide, forms a device for matching the relatively high impedance of the sequence of resonators to the lower impedance of the adjacent part of the waveguide.

In order to provide a sequence of coupled resonators the central section 9 of the grating 7 has a period almost equal to half the wavelength of light in the waveguide at the desired operating frequency of the device and exhibits equally spaced phase steps along its length, typically of about $\pi$ radians, e.g. by arranging for the spacing between adjacent lines of the grating periodically to differ from the normal value, so that the lines immediately to one side of the abnormal spacing are 'out of phase' with the lines immediately to the other side of the abnormal spacing. The parts of the grating 7 immediately on either side of each such phase step together form a mirror resonant cavity around the phase step between them, which cavity is coupled to the adjacent such resonant cavities.

The matching devices formed by sections 11 and 13 of the grating 7 each effectively comprise one or more further cavities of the kind incorporated in the sequence of coupled resonators comprising the central section 9 of the grating 7, but with a grating of reduced amplitude. If desired the matching device grating sections 11 and 13 may comprise a number of sub-sections, of respectively different grating amplitudes, which reduce in a direction away from the central grating section 9.

Figure 2A:
FIGS. 2A and 2B are graphs illustrating the form of a Bragg diffraction grating structure incorporated in the device.
Figure 2B:
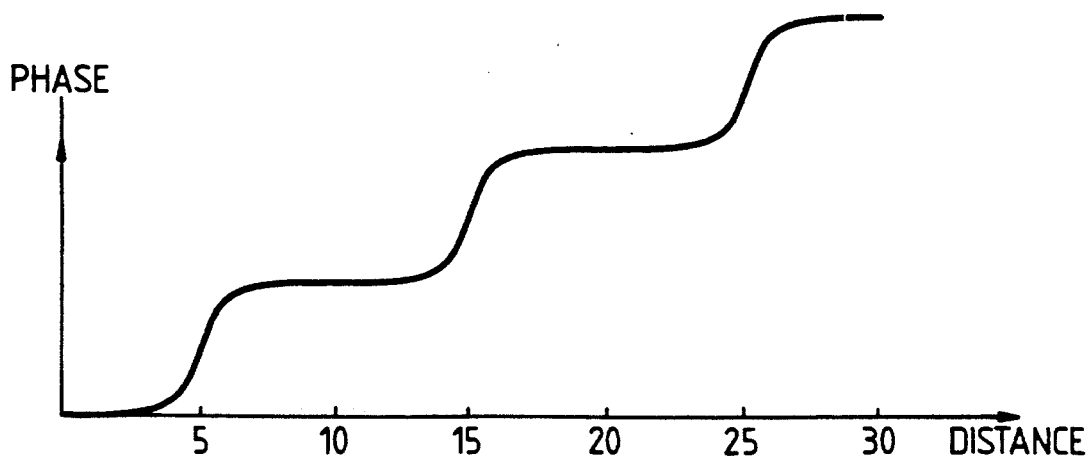

The grating 7 is suitably formed using a Moiré grating fabrication technique as described by D. J. C. Reid, C. M. Ragdale, I. Bennion, D. J. Robbins, J. Buus and W. J. Stewart in Electronic Letters, Volume 26 No. 1 at pages 10 to 12 and in UK Patent Specification No. GB 2209408A. In this technique a Moiré grating is formed in a layer of photoresist material formed on the exposed surface of the stripe 1 where the grating 7 is required to be formed, by exposing the resist to two interference patterns of slightly different periods, each interference pattern being obtained by interference of two beams derived from a laser. The resist is then developed and the grating transferred into the stripe 1, e.g., by etching or ion-beam milling. The resulting grating is thus in the form of corrugations of a shape corresponding to the waveform obtained by the addition of two sine waves of slightly different frequency, the phase steps occurring at the points on wave where the amplitude is a minimum, as illustrated in FIG. 2A, FIG. 2B showing the phase steps.

In an alternative method of fabricating the grating 7, a layer of a photochromic material dissolved in a suitable matrix is applied to the exposed surface of the stripe 1 instead of a layer of a photoresist material. After exposure of the material to the two interference patterns the refractive index in the layer varies cyclically along the layer, with phase steps in the cyclic variation at spaced positions, to form the desired grating structure.

In one particular embodiment of the device of FIG. 1 the central section 9 of the grating structure exhibits fifteen phase steps so as to have fifteen coupled mirror resonant cavities. Between each adjacent pair of phase steps there are 1032 λ/4 thick layers whose refractive indices alternate between peak values of 3.00 and 3.03. Each matching section 11 and 13 comprises effectively a further eight phase steps with 1032 λ/4 layers between each adjacent pair of phase steps whose refractive indices alternate between peak values of 3.00 and a value which reduces e.g. in steps, one at each phase step, from 3.03 to 3.00 in a direction away from the central grating section 9.

Figure 3A:
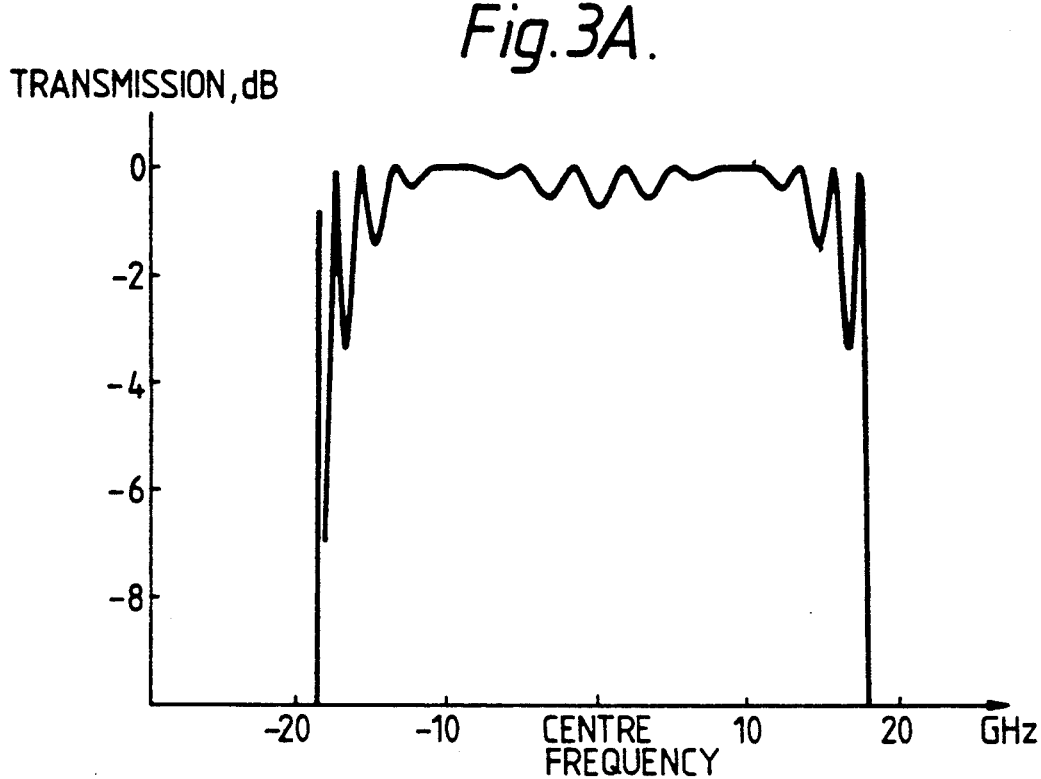
FIGS. 3A and 3B are graphs illustrating the performance of one particular embodiment of the device of FIG. 1.
Figure 3B:
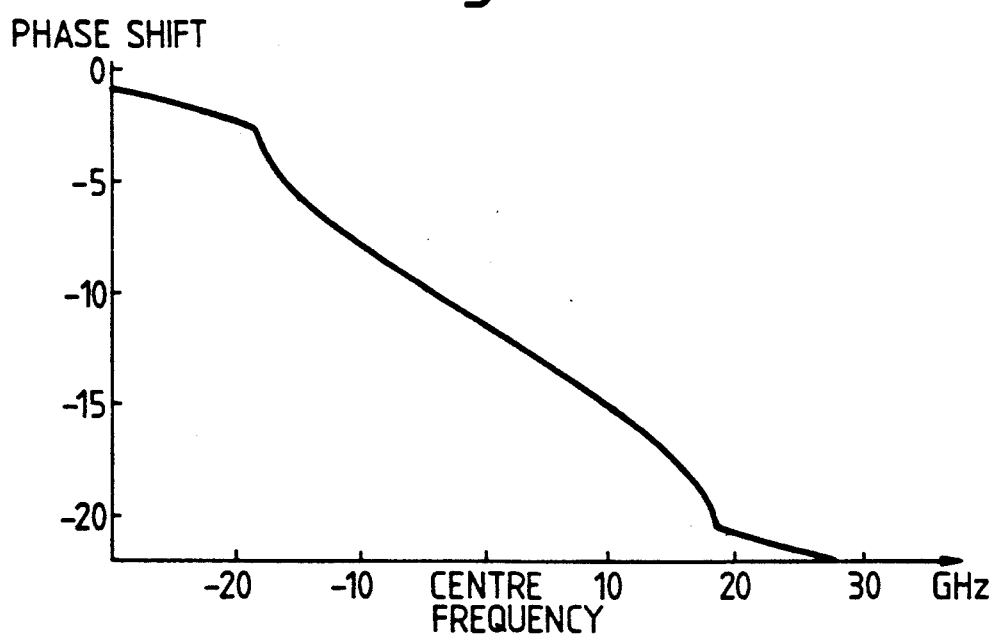

FIGS. 3A and 3B show the transmission and phase shift of the device respectively. As can be seen from FIG. 3B low dispersion and high transmission is obtained over a range of about 30 GHz.

With the device as shown in FIG. 1 delay times of about 5 nanoseconds can be obtained with a device of length such as can be accommodated on a 10 mm square III-V semiconductor material chip.

Whilst in the device described by way of example with reference to FIG. 1, matching devices are provided at each end of the sequence of coupled resonators constituted by central section 9 of the grating 7, such matching devices are not necessary in a device according to the invention. Thus, in the device of FIG. 1 if the central section 9 terminates at each end at a point where the grating amplitude is a maximum, so that the two end resonators in section 9 are each complete, an acceptable match of the device to the adjacent waveguide can be obtained without the use of matching devices.

In an alternative form of device in accordance with the invention, instead of using a grating structure exhibiting phase steps along its length, a grating structure of regular form along its whole length is used and the phase steps are provided by discontinuities in the optical waveguide e.g. by changes in the width of the waveguide.

In still further forms of device in accordance with the invention, instead of using a grating to form the coupled sequence of resonant cavities, the cavities are formed by providing semi-reflective planes at spaced positions along the length of the waveguide.

It will be understood that whilst the particular embodiment of a device according to the invention described above by way of example is designed so as to exhibit a required delay with low dispersion over the desired operating frequency band and very low transmission outside that band, other devices according to the invention may be designed primarily to provide characteristics other than delay with the provision of delay only an incidental effect. Thus a device according to the invention may be designed primarily to provide a desired filter characteristic. Alternatively, a device according to the invention may be designed primarily to provide a dispersion such as to correct for undesirable dispersion in other components of an optical system, or to provide pulse expansion or compression. In this connection it is pointed out that a device in accordance with the invention may be actively controlled by application of electric fields to the material of the device in known manner, to control the refractive index of the material of the device, thereby, for example, to vary the effective grating coupling constant where a grating is used in the device. In this connection it is also pointed out that in a device according to the invention the propagation direction is determined by the sign of the phase difference between the waves in adjacent resonator structures. Thus by actively controlling the device to reverse the sign of these phase differences, the propagation direction in the device may be reversed.

It will be understood that in a device according to the invention the optical waveguide may be of any suitable form e.g. in the form of an optical fibre instead of in the form of a integrated optical planar waveguide.

I claim:

1. An optical device comprising a length of optical waveguide having incorporated therein an extended sequence of coupled single substantially identical resonator structures so as to form an optical slow wave structure.

2. A device according to claim 1 wherein said sequence of coupled resonator structures is formed by a Bragg diffraction grating pattern extending along the waveguide in the direction of propagation of light through the waveguide, the grating pattern exhibiting spaced phase steps so that a resonator structure is formed around each phase step.

3. A device according to claim 2 wherein the grating pattern comprises a corrugated surface.

4. A device according to claim 2 wherein the grating pattern comprises a pattern of material of cyclically varying refractive index.

5. A device according to claim 1 including an impedance matching device at each end of the sequence of coupled resonator structures.

6. A device according to claim 5 wherein each said matching device comprises a grating pattern extending along the waveguide.

7. A device according to claim 1 wherein said waveguide is a planar waveguide formed on a substrate.

* * * * *